US012674414B2

(12) United States Patent
Terwilliger et al.

(10) Patent No.: US 12,674,414 B2
(45) Date of Patent: Jul. 7, 2026

(54) PARTIAL EXHAUST CONDENSATION REGENERATOR

(71) Applicant: RTX CORPORATION, Farmington, CT (US)

(72) Inventors: Neil J. Terwilliger, Cheshire, CT (US); Abbas A. Alahyari, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/367,212

(22) Filed: Sep. 12, 2023

(65) Prior Publication Data
US 2025/0084786 A1 Mar. 13, 2025

(51) Int. Cl.
*F02C 3/30* (2006.01)
*F02C 3/34* (2006.01)

(52) U.S. Cl.
CPC ................ *F02C 3/305* (2013.01); *F02C 3/34* (2013.01); *F05D 2220/323* (2013.01)

(58) Field of Classification Search
CPC ...... F05D 2220/323; F02C 3/305; F02C 3/30; F02C 6/18; F02C 3/34
See application file for complete search history.

(56) References Cited

U.S. PATENT DOCUMENTS 4,924,934 A * 5/1990 Steele ................... F24F 3/1423
165/8
5,628,183 A 5/1997 Rice

| | | | |
|---|---|---|---|
| 11,635,022 B1 | 4/2023 | Terwilliger et al. | |
| 11,686,222 B2 | 6/2023 | Hu | |
| 2012/0159957 A1 | 6/2012 | Tang et al. | |
| 2015/0000292 A1* | 1/2015 | Subramaniyan | .......... F02K 1/48 |
| | | | 60/39.12 |
| 2021/0207500 A1* | 7/2021 | Klingels | ................. F02C 3/305 |
| 2023/0150678 A1* | 5/2023 | Klingels | ............... B64D 33/04 |
| | | | 244/55 |

FOREIGN PATENT DOCUMENTS

| EP | 0634563 | * | 1/1995 |
|---|---|---|---|
| WO | 2014164799 A1 | | 10/2014 |

OTHER PUBLICATIONS

Extended European Search Report for European Application No. 24200106.3 mailed Feb. 6, 2025.

* cited by examiner

*Primary Examiner* — Phutthiwat Wongwian
*Assistant Examiner* — Roberto Toshiharu Igue
(74) *Attorney, Agent, or Firm* — Carlson, Gaskey & Olds, P.C.

(57) ABSTRACT

A turbine engine assembly generates an exhaust gas flow that is divided into a first exhaust gas flow and a second exhaust gas flow. A desiccation system transfers water vapor from the first exhaust gas flow into the second exhaust gas flow. A condenser extracts water from the second exhaust gas flow and an evaporator system uses thermal energy from the exhaust gas flow to generate a steam flow from at least a portion of water that is extracted by the condenser for injection into the core flow path.

16 Claims, 6 Drawing Sheets

PARTIAL EXHAUST CONDENSATION REGENERATOR

STATEMENT REGARDING FEDERALLY SPONSORED RESEARCH OR DEVELOPMENT

This invention was made with Government support under Contract DE-AR0001561 awarded by the United States Department of Energy, Office of ARPA-E. The Government has certain rights in this invention.

TECHNICAL FIELD

The present disclosure relates generally to an aircraft propulsion system that uses a desiccant to concentrate exhaust humidity to aid water recover and steam generation for a gas turbine engine.

BACKGROUND

Reduction and/or elimination of carbon emissions generated by aircraft operation is a stated goal of aircraft manufacturers and airline operators. Turbine engines compress incoming core airflow, mix the compressed airflow with fuel that is ignited in a combustor to generate an exhaust gas flow. Steam injection can provide improved propulsive efficiencies. Water recovered from the exhaust gas flow may be transformed into steam using thermal energy from the exhaust gas flow. Exit steam from the turbine section is mixed and diluted with air including nitrogen, carbon dioxide and oxygen. The additional components can reduce water extraction efficiency.

SUMMARY

A turbine engine assembly according to an exemplary embodiment of this disclosure includes, among other possible things, a compressor section where an inlet airflow is compressed, a combustor section where the compressed inlet airflow is mixed with fuel and ignited to generate an exhaust gas flow that is communicated through a core flow path, a turbine section through which the exhaust gas flow expands to generate a mechanical power output, the exhaust gas flow is divided into a first exhaust gas flow and a second exhaust gas flow, a desiccation system where water vapor from the first exhaust gas flow is concentrated and released into the second exhaust gas flow, a condenser where water from the second exhaust gas flow is extracted, and an evaporator system where thermal energy from the exhaust gas flow is utilized to generate a steam flow from at least a portion of water that is extracted by the condenser for injection into the core flow path.

In a further embodiment of the foregoing turbine engine assembly, the desiccation system includes a first part and a second part that are interchanged between exposure to the first exhaust gas flow and the second exhaust gas flow.

In a further embodiment of any of the foregoing turbine engine assemblies, each of the first part and the second part absorbs water vapor when exposed to the first exhaust gas flow and releases moisture when exposed to the second exhaust gas flow.

In a further embodiment of any of the foregoing turbine engine assemblies, when the first part is exposed to the first exhaust gas flow, the second part is exposed to the second exhaust gas flow.

In a further embodiment of any of the foregoing turbine engine assemblies, the first part and the second part are part of a common rotating element for interchanging the first part and the second part between the first exhaust gas flow and the second exhaust gas flow.

In a further embodiment of any of the foregoing, the turbine engine assembly includes a precooler that is disposed between the evaporator system and the desiccation system.

In a further embodiment of any of the foregoing turbine engine assemblies, the second exhaust gas flow is tapped from a location upstream of an aft exit of the turbine section.

In a further embodiment of any of the foregoing turbine engine assemblies, the evaporator system is in thermal communication with the first exhaust gas flow and the second exhaust gas flow is routed around the evaporator system.

In a further embodiment of any of the foregoing turbine engine assemblies, the evaporator system is in thermal communication with both the first exhaust gas flow and the second exhaust gas flow.

In a further embodiment of any of the foregoing, the turbine engine assembly includes a secondary evaporator that is exposed to the second exhaust gas flow between the desiccation system and the condenser.

In a further embodiment of any of the foregoing turbine engine assemblies, the first exhaust gas flow is exhausted through a first nozzle and the second exhaust gas flow is exhausted through a second nozzle.

An aircraft propulsion system according to another exemplary embodiment of this disclosure includes, among other possible things, a propulsor section, a core engine that defines a core flow path where an inlet airflow is compressed, mixed with fuel and ignited to generate an exhaust gas flow that generates shaft power to drive the propulsor section, the exhaust gas flow is divided into a first exhaust gas flow and a second exhaust gas flow, a desiccation system where a desiccant material absorbs water vapor from the first exhaust gas flow and releases the absorbed water vapor into the second exhaust gas flow, a condenser that is configured for extracting water from the second exhaust gas flow, an evaporator system that is configured to use thermal energy from the exhaust gas flow to vaporize water into a steam flow from at least a portion of water that is extracted by the condenser for injection into the core flow path.

In a further embodiment of the foregoing aircraft propulsion system, desiccation system includes a means of interchanging different parts of the desiccant material between the first exhaust gas flow and the second exhaust gas flow.

In a further embodiment of any of the foregoing, the aircraft propulsion system includes a controller that is programed to interchange parts of the desiccation system to concentrate moisture within the second exhaust gas flow.

In a further embodiment of any of the foregoing aircraft propulsion systems, the second exhaust gas flow is tapped from a location upstream of an aft exit of the core engine.

In a further embodiment of any of the above, the aircraft propulsion system includes a precooler where the first exhaust gas flow is cooled prior to communication with the desiccation system.

In a further embodiment of any of the foregoing aircraft propulsion systems, the evaporator system is in thermal communication with both the first exhaust gas flow and the second exhaust gas flow.

A method of operating a turbine engine according to another exemplary embodiment of this disclosure includes, among other possible things, generating an exhaust gas flow containing water vapor and dividing the exhaust gas flow into a first exhaust gas flow and a second exhaust gas flow, absorbing water vapor from the first exhaust gas flow with a desiccant material, releasing water vapor from desiccant material into the second exhaust gas flow, condensing and extracting water for the second exhaust gas flow in a condenser, and heating a portion of the extracted water flow to generate a steam flow for injection into a core flow path of the turbine engine.

In a further embodiment of the foregoing, the method includes concurrently absorbing water vapor from the first exhaust gas flow with a first part of the desiccant material and releasing previously absorbed water vapor from a second part of the desiccant material into the second exhaust gas flow.

In a further embodiment of any of the foregoing, the method includes continuously switching the first part and second part of the desiccant material between the first exhaust gas flow and the second exhaust gas flow to increase the amount of water vapor in the second exhaust gas flow.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
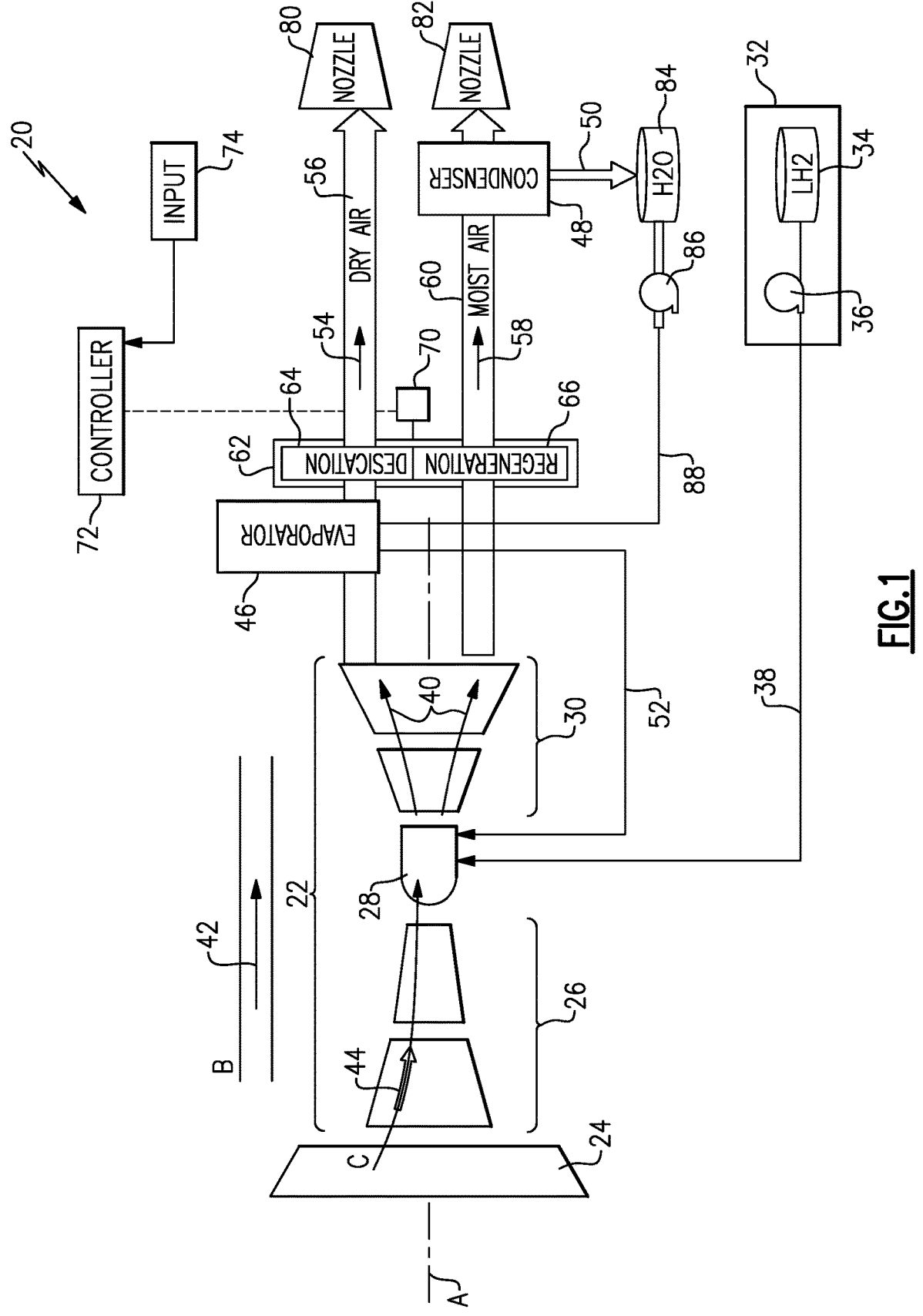
FIG. 1 is a schematic view of an example aircraft propulsion system embodiment.

FIG. 1 schematically illustrates an example propulsion system 20 that includes a desiccation system to concentrate water vapor into a partial portion of an exhaust gas flow. The desiccation system absorbs water vapor from a first portion of the exhaust gas flow and releases the water vapor into a second portion of the exhaust gas flow. The water vapor enhanced second portion of the exhaust gas flow is communicated to a condenser for water extraction. Water condensation and extraction from the exhaust gas flow is improved by condensing only a portion of the exhaust gas flow that includes an increased moisture content.

The example propulsion system 20 includes a fan section 24 and a core engine 22. The core engine 22 includes a compressor section 26, a combustor section 28 and the turbine section 30 disposed along an engine longitudinal axis A. The fan section 24 drives inlet airflow along a bypass flow path B, while the compressor section 26 draws air in along a core flow path C. The inlet airflow is compressed and communicated to the combustor section 28 where a compressed core airflow 44 is mixed with a fuel flow 38 and ignited to generate the exhaust gas flow 40. The exhaust gas flow 40 expands through the turbine section 30 where energy is extracted and utilized to drive the fan section 24 and the compressor section 26.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

A fuel system 32 including at least a fuel tank 34 and a fuel pump 36 to provide the fuel flow 38 to the combustor 28. The example fuel system 32 is configured to provide a hydrogen based fuel such as a liquid hydrogen ($LH_2$). Although hydrogen is disclosed by way of example, other non-carbon based fuels could be utilized and are within the contemplation of this disclosure. Moreover, the disclosed features may also be beneficial in an engine configured to operate with traditional carbon fuels and/or biofuels, such as sustainable aviation fuel.

An evaporator system 46 and condenser 48 are disposed downstream of the turbine section 30 and receive portions of the exhaust gas flow 40. The evaporator system 46 utilizes thermal energy from the exhaust gas flow 40 to generate a steam flow 52 from a water flow 50 extracted by the condenser 48. The condenser 48 cools the exhaust gas flow 40 to extract water that is gathered in a tank 84 and pressurized by a pump 86 for communication of a pressurized water flow 88 to the evaporator system 46. In one disclosed example, a ram air flow 42 through the bypass flow path B may be utilized to cool exhaust gas within the condenser 48. Other cold sink sources within the engine, such as for example the fuel flow 38, may be utilized to cool the exhaust gas flow within the condenser 48 and are within the contemplation and scope of this disclosure.

The steam flow 52 from the evaporator 46 is communicated to the combustor 28 and combines with the exhaust gas flow 40 to increase mass flow through the turbine section 30 and thereby increase engine power and efficiency. The propulsion system 20 has an increased power output from the injected steam 52 due to an increasing mass flow through the turbine section 30 without a corresponding increase in work from the compressor section 26. Although the steam flow 52 is shown as being injected into the combustor 28, the steam flow 52 may be injected at other locations along the core flow path C.

The exhaust gas flow 40 is a mix of steam, and components from combustion of fuel. The components from combustion can include, among other possible components, nitrogen, carbon dioxide and oxygen. These combustion components reduce the efficiency of the condenser 48 in condensing liquid water from the exhaust gas flow 40. Moreover, the bypass ram air flow 42 has a limited capacity for cooling that may further reduce condenser efficiencies. The example propulsion system provides for increased condenser efficiencies by separating the exhaust gas flow 40 into a first exhaust gas flow 54 and a second exhaust gas flow 58. Steam and water are concentrated in the second exhaust gas flow 58 by a desiccation system 62. Only the second exhaust gas flow 58 is communicated to the condenser 48 for extraction of water.

In one disclosed example, a first passage 56 communicates the first exhaust gas flow 54 through the evaporator 46 to a first part 64 of the desiccation system 62. A second passage 60 communicates the second exhaust gas flow 58 through a second part 66 of the desiccation system 62. Each of the first part 64 and the second part 66 include a desiccant material for absorbing moisture. Generally, desiccant material is a hygroscopic substance that absorbs water. Examples of desiccant material include silica gel, activated charcoal, calcium sulfate, calcium chloride and certain types of molecular sieves, all of which may be utilized within the desiccation system 62 and are within the scope and contemplation of this disclosure.

The first part 64 and the second part 66 of the desiccation system 62 are interchanged between the first and second exhaust gas flows 54 and 58. Water is absorbed in one part disposed within the first exhaust gas flow 54 and released into the second exhaust gas flow 58. Accordingly, the first part 64 and the second part 66 of the desiccation system 62 are substantially the same and are interchanged between the two exhaust gas flows 54, 58 by an actuator 70.

In an example operational embodiment, water vapor within the first exhaust gas flow 54 is captured in the first part 64 of the desiccation system 62. Concurrently, heat from the second exhaust gas flow 58 generates a release of water vapor from the second part 66 of the desiccation system 62. Release of the water vapor from the second part 66 adds to the water vapor already present to enhance the water vapor content within the second exhaust gas flow 58. The water enhanced second exhaust gas flow 58 is communicated to the condenser 48 for extraction of water 50. An efficiency of water extraction is increased due to communicating the water concentrated portion of the total exhaust gas flow 40 to the condenser 48.

The first exhaust gas flow 54 is communicated through the evaporator 46 prior to entering the first part 64 of the desiccation system 62. The second exhaust gas flow 58 is communicated directly to the second part 66 of the desiccation system 62. The thermal energy expended to generate the steam flow 52 in the evaporator 46 results in a cooling of the first exhaust gas flow 54 as compared to the second exhaust gas flow 58. Cooling of the first exhaust gas flow 54 aids in the absorption of water vaper by the desiccant material in the first part 64 of the desiccation system 62. The relatively hotter second exhaust gas flow 58 enables releasing of water vapor in the second part 66 in preparation for being cycled back into contact with the cooler first exhaust gas flow 54.

The first exhaust gas flow 54 is eventually exhausted through a nozzle 80 and the second exhaust gas flow 58 is eventually exhausted through a nozzle 82. Dissimilar pressures and temperatures between the first and second exhaust gas flows 54, 58 may need to be exhausted through different nozzles as shown by way of the two nozzles 80, 82. Alternatively, the two exhaust gas flows 54, 58 may be recombined and exhausted through a single nozzle and is within the contemplation and scope of this disclosure.

A controller 72 commands operation of the actuator 70 based on inputs 74 that are indicative of a state of each of the first part 64 and the second part 66 relating to moisture content. When the first part 64 has absorbed some predefined amount of moisture from the first exhaust gas flow 54, the actuator 70 facilitates switching the first part 64 into the second passage 60 and into communication with the second exhaust gas flow 58. Concurrently, information regarding regeneration of the second part 66 of the desiccation system 62 is also provided to the controller 72 and utilized to determine when to interchange the first part 64 and the second part 66.

The example controller 72 is a device and system for performing necessary computing or calculation operations of the actuator 70. The controller 72 may be specially constructed for operation of the actuator 70, or it may comprise at least a general-purpose computer selectively activated or reconfigured by software instructions stored in a memory device. The controller 72 may further be part of full authority digital engine control (FADEC) or an electronic engine controller (EEC).

Figures 2, 3:
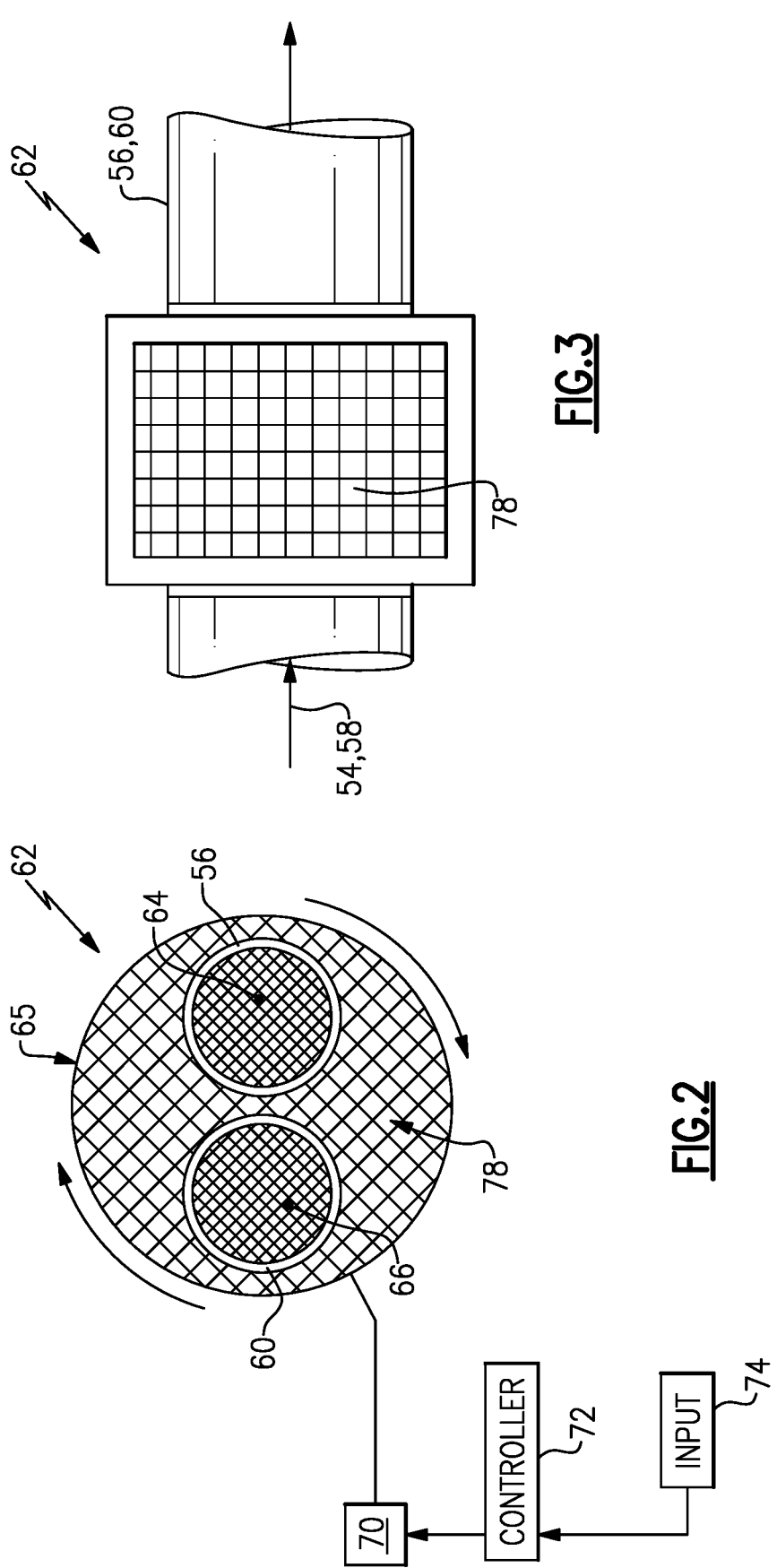
FIG. 2 is a schematic view of a portion of an example desiccation system embodiment.
FIG. 3 is a schematic view of another portion of the example desiccation system embodiment.

Referring to FIGS. 2 and 3 with continued reference to FIG. 1, the example desiccation system 62 includes desiccant material 78 supported on a wheel 65 that rotates to move portions of the desiccant material 78 into communication with the first and second exhaust gas flows 54, 58. The wheel 65 is rotatable by the actuator 70 to interchange portions of the desiccant material 78 between the first and second exhaust gas flows 54, 58. The wheel 65 extends across each of the flow passages 56, 60 such that each of the gas flows 54, 58 are communicated through the desiccant material 78. The first part 64 and the second part 66 denote that part of the desiccant material 78 that is exposed to the corresponding one of the first exhaust gas flow 54 and the second exhaust gas flow 58. In one example embodiment, the first part 64 and the second part 66 are not discrete portions of the desiccant material 78, but are instead that portion of the desiccant material 78 that is disposed within the corresponding first and second passages 56, 60.

The actuator 70 rotates the wheel 65 to interchange desiccant material from an absorbing position in communication with the first exhaust gas flow 54 and a desorbing or regenerating position when in communication with the second exhaust gas flow 58. The actuator 70 may continually rotate the wheel 65 to provide continual absorption and desorption. The actuator 70 may also move the wheel 65 at specified time intervals that correspond with absorption and desorption capabilities. Additionally, the controller 72 may vary how the actuator 70 drives the wheel 65 to adjust a rate of transfer of water vapor between the first and second exhaust gas flows 54, 58. The rate of transfer may be based on current engine operating conditions and/or performed based on a predefined schedule corresponding to an engine operating cycle. Although example operative embodiments are disclosed, other operating cycles based on other information could be utilized and are within the contemplation and scope of this disclosure.

Figure 4:
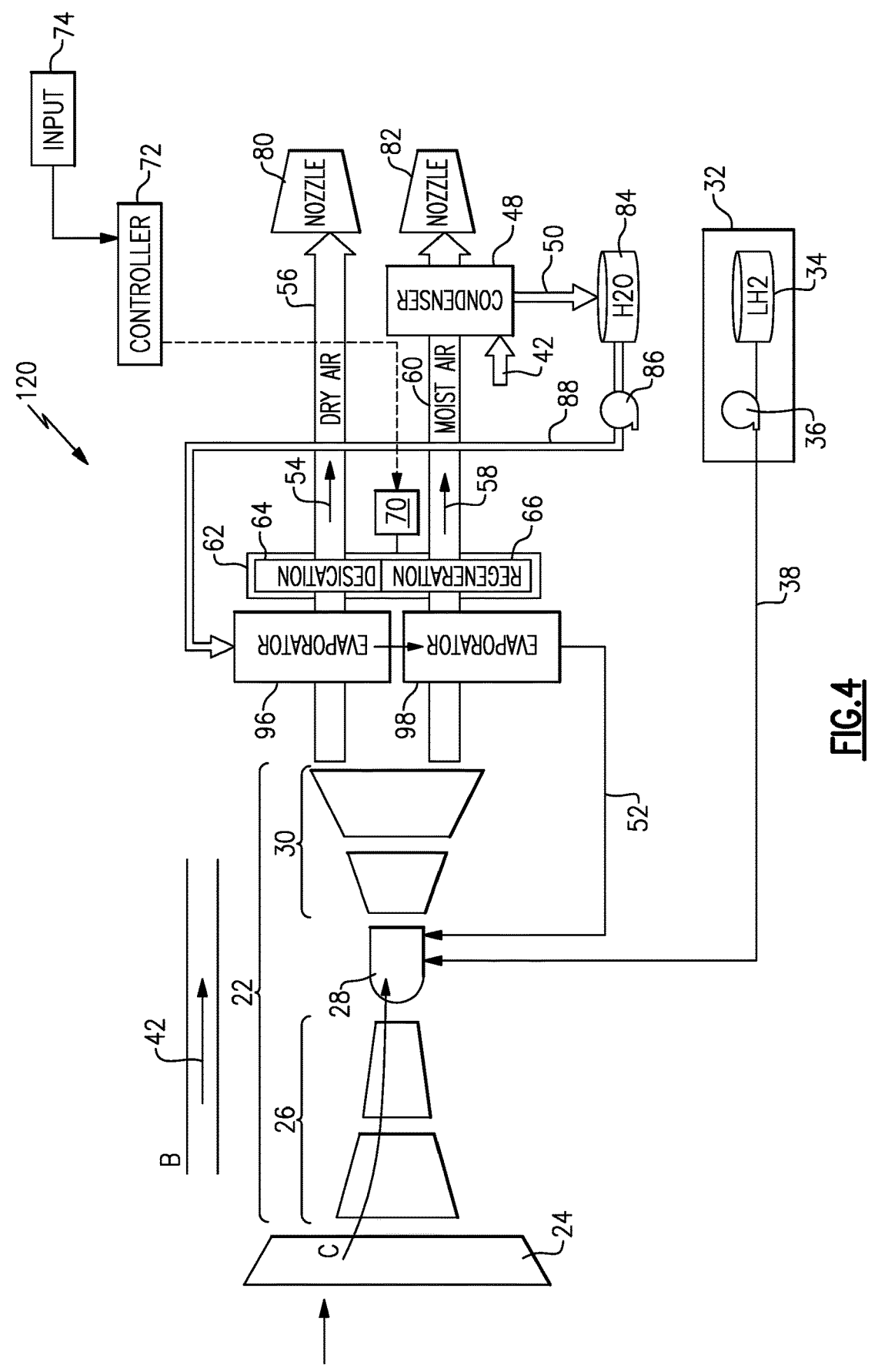
FIG. 4 is a schematic view of another example aircraft propulsion system embodiment.

Referring to FIG. 4, another example propulsion system 120 is schematically shown and includes a first evaporator 96 and a second evaporator 98. The first evaporator 96 is in thermal communication with the first exhaust gas flow 54 and the second evaporator 98 is in thermal communication with the second exhaust gas flow 58. The first and second evaporators 96, 98 combine to generate the steam flow 52. The example second evaporator 98 has a lesser capacity for thermal transfer than the first evaporator 96. Accordingly, most heating is performed in the first evaporator 96. Additional thermal communication is conducted in the second evaporator 98, however, to a lesser extent so that the second exhaust gas flow 58 is hotter than that of the first exhaust gas flow 54. The hotter second exhaust gas flow 58 provides for the desorption and release of water vapor from the second part 66 of the desiccation system 62 to enable regeneration and preparation for the next absorption cycle when in contact with the first exhaust gas flow 54.

Figure 5:
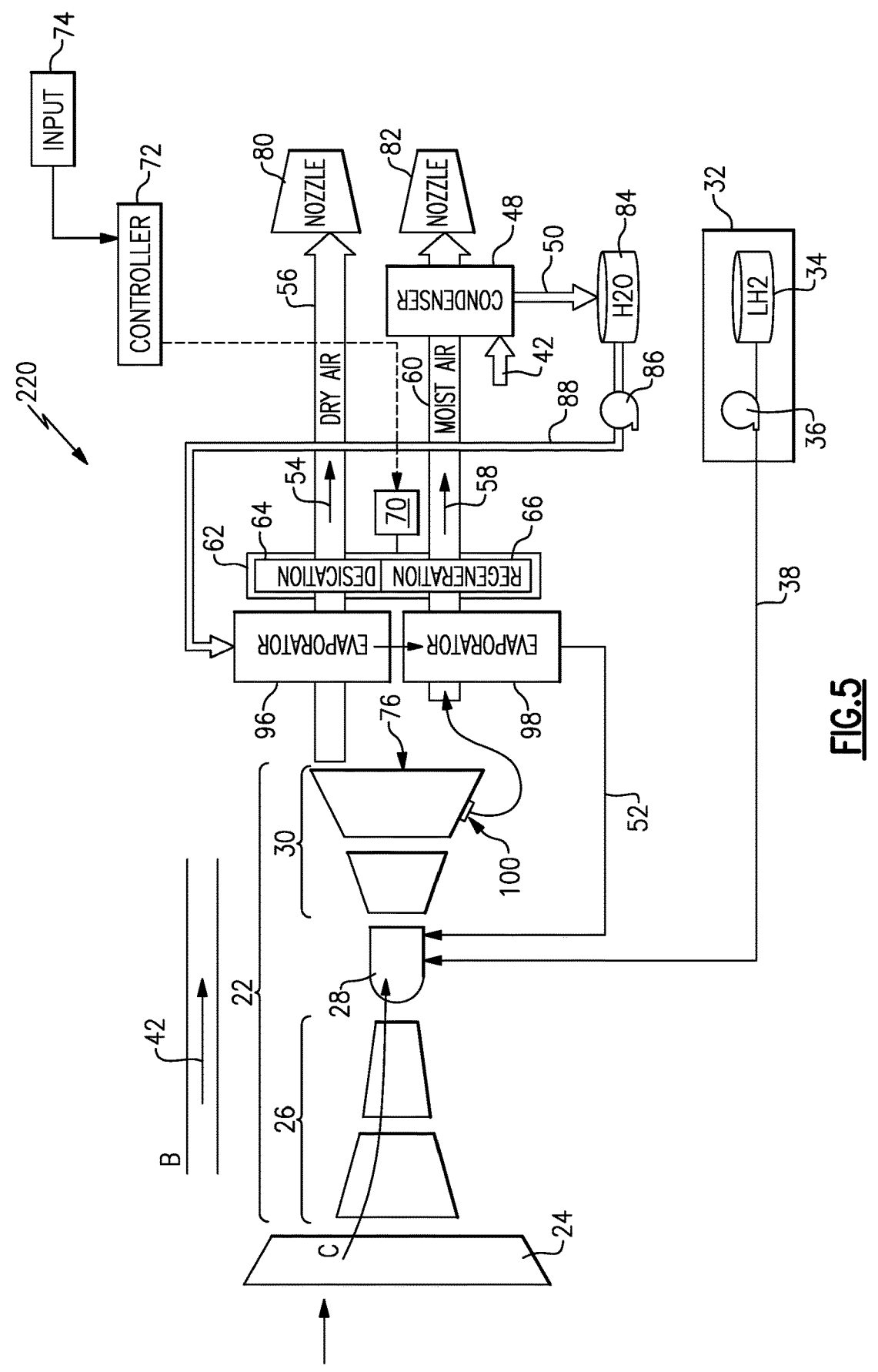
FIG. 5 is a schematic view of yet another example aircraft propulsion system embodiment.

Referring to FIG. 5, another example propulsion system 220 taps the second exhaust gas flow 58 from a location 100 forward of an aft end 76 of the turbine section 30. The forward location 100 communicates a higher pressure and temperature exhaust gas flow. The higher pressure and temperature provided by tapping exhaust gas flow 58 improves removal and drying of the desiccant material. Although an example forward location 100 is shown by way of example, other locations within the turbine section that provide exhaust gas flows of increased temperatures could be utilized and are within the contemplation of this disclosure.

Figure 6:
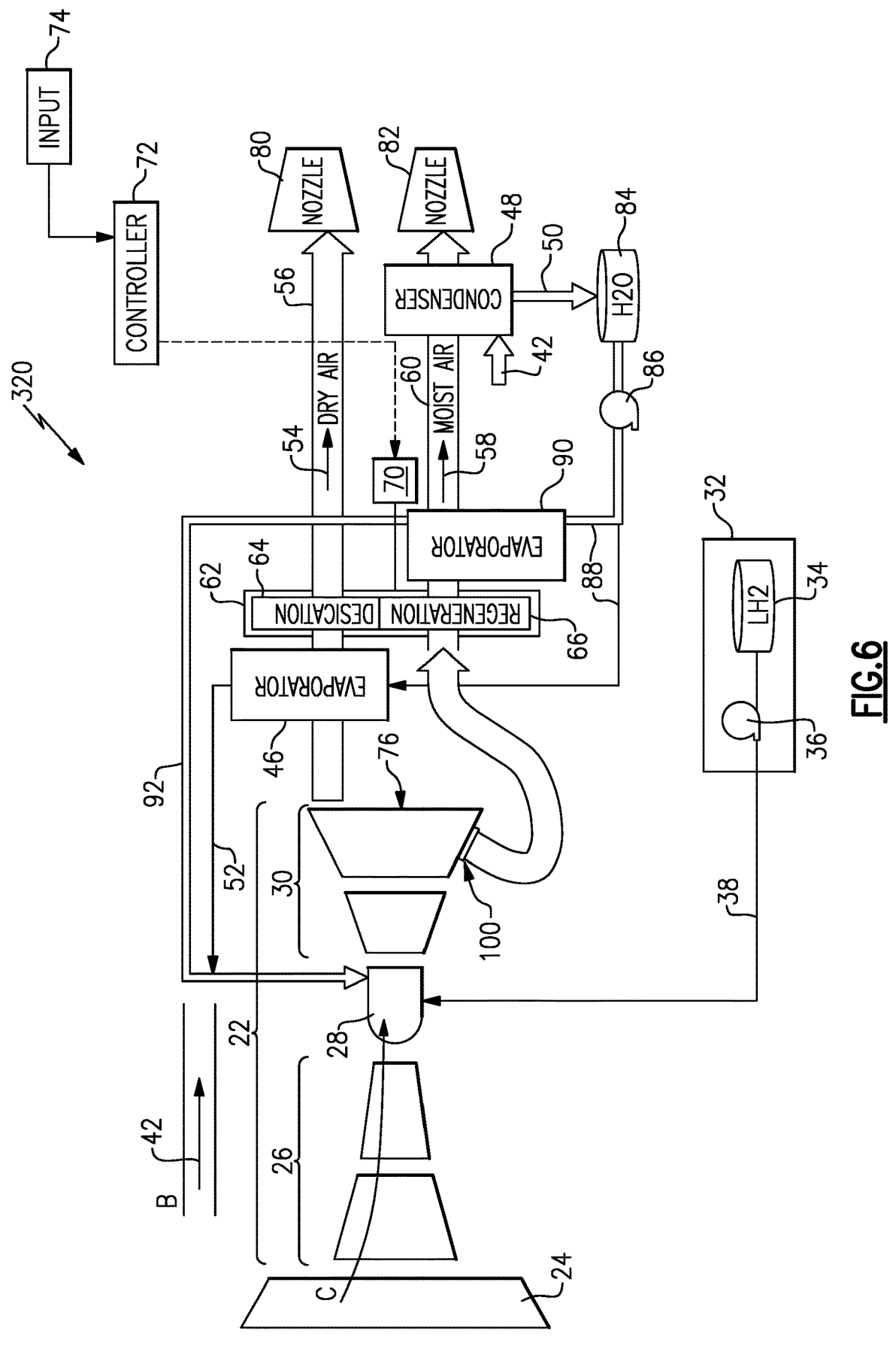
FIG. 6 is a schematic view of still another example aircraft propulsion system embodiment.

Referring to FIG. 6, another example propulsion system 320 includes the evaporator 46 in thermal communication with the first exhaust gas flow 54 and also taps the second exhaust gas flow 58 from the forward location 100. Additionally, a second evaporator 90 is disposed in thermal communication with the second exhaust gas flow 58 downstream from the desiccation system 62. The second evaporator 90 provides for the generation of a second steam flow 92 that is communicated to the combustor 28. Without an evaporator forward of the desiccation system 62, the temperature differential between the first exhaust gas flow 54 and the second exhaust gas flow 58 at the desiccation system 62 is increased to provide further efficiencies in drying and regenerating the desiccant material during operation. The increased efficiencies may speed up drying and regeneration times, or enable an increased amount of water vapor to be concentrated in the second exhaust gas flow 58.

Figure 7:
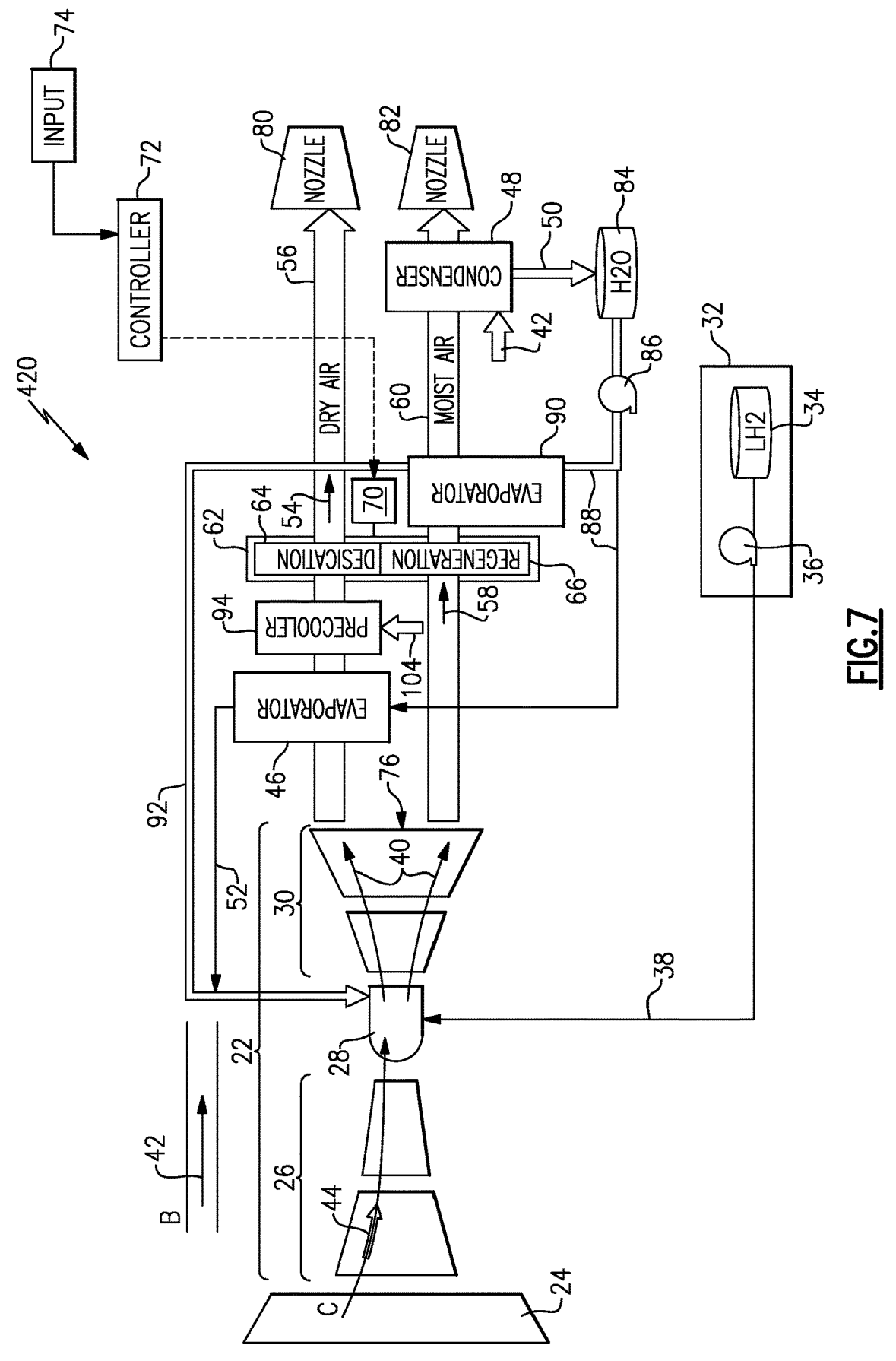
FIG. 7 is a schematic view of still yet another example aircraft propulsion system embodiment.

Referring to FIG. 7, another example propulsion system 420 includes the evaporators 46 and 90 and a precooler 94 for cooling the first exhaust gas flow 54. The precooler 94 may be a heat exchanger that is in thermal contact with a cold sink flow schematically indicated at 104 of the propulsion system 420. The cold sink flow 104 may be the fuel flow 38, the ram air flow 42 or any other flows that facilitate cooling of the first exhaust gas flow 54. Cooling of the first exhaust gas flow 54 may increase the amount and rate at which water is absorbed by the desiccant material within the first part 64 of the desiccation system 62. Moreover, cooling of the first exhaust gas flow 54 increases the temperature differential between the first exhaust gas flow 54 and the second exhaust gas flow 58. The increased temperature differential not only aids in the absorption of water vapor in the first part 64 of the desiccation system 62 but also aids in the release of water vapor in the second part 66 of the desiccation system 62.

Additionally, the second exhaust gas flow 58 may be tapped from a forward, upstream location as is shown in FIGS. 5 and 6. Tapping from a forward upstream location would increase the temperature differential to further increase water vapor release and concentration for communication to the condenser 48.

Accordingly, the example desiccation system absorbs water vapor from a first portion of the exhaust gas flow and releases the water vapor into a second portion of the exhaust gas flow to concentrate water vapor in a partial portion of the exhaust gas flow that is communicated to the condenser for water extraction.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine assembly comprising:
a compressor section where an inlet airflow is compressed;
a combustor section where the compressed inlet airflow is mixed with fuel and ignited to generate an exhaust gas flow that is communicated through a core flow path;

a turbine section through which the exhaust gas flow expands to generate a mechanical power output, wherein the exhaust gas flow is divided into a first exhaust gas flow and a second exhaust gas flow, and the first exhaust gas flow is exhausted through a first nozzle and the second exhaust gas flow is exhausted through a second nozzle;
a desiccation system where water vapor from the first exhaust gas flow is concentrated and released into the second exhaust gas flow;
a condenser where water from the second exhaust gas flow is extracted; and
an evaporator system where thermal energy from the exhaust gas flow is utilized to generate a steam flow from at least a portion of water extracted by the condenser for injection into the core flow path.

2. The turbine engine assembly as recited in claim 1, wherein the desiccation system includes a first part and a second part that are interchanged between exposure to the first exhaust gas flow and the second exhaust gas flow.

3. The turbine engine assembly as recited in claim 2, wherein each of the first part and the second part absorbs water vapor when exposed to the first exhaust gas flow and releases moisture when exposed to the second exhaust gas flow.

4. The turbine engine assembly as recited in claim 3, wherein when the first part is exposed to the first exhaust gas flow, the second part is exposed to the second exhaust gas flow.

5. The turbine engine assembly as recited in claim 4, wherein the first part and the second part are part of a common rotating element for interchanging the first part and the second part between the first exhaust gas flow and the second exhaust gas flow.

6. The turbine engine assembly as recited in claim 1, including a precooler disposed between the evaporator system and the desiccation system.

7. The turbine engine as recited in claim 1, wherein the second exhaust gas flow is tapped from a location upstream of an aft exit of the turbine section.

8. The turbine engine assembly as recited in claim 1, wherein the evaporator system is in thermal communication with the first exhaust gas flow and the second exhaust gas flow is routed around the evaporator system.

9. The turbine engine assembly as recited in claim 1, wherein the evaporator system is in thermal communication with both the first exhaust gas flow and the second exhaust gas flow.

10. The turbine engine assembly as recited in claim 1, including secondary evaporator that is exposed to the second exhaust gas flow between the desiccation system and the condenser.

11. An aircraft propulsion system comprising:
a propulsor section;
a core engine that defines a core flow path where an inlet airflow is compressed, mixed with fuel, and ignited to generate an exhaust gas flow that generates shaft power to drive the propulsor section, wherein the exhaust gas flow is divided into a first exhaust gas flow and a second exhaust gas flow, and the first exhaust gas flow is exhausted through a first nozzle and the second exhaust gas flow is exhausted through a second nozzle;
a desiccation system where a desiccant material absorbs water vapor from the first exhaust gas flow and releases the absorbed water vapor into the second exhaust gas flow;

a condenser configured for extracting water from the second exhaust gas flow;

an evaporator system configured to use thermal energy from the exhaust gas flow to vaporize water into a steam flow from at least a portion of water extracted by the condenser for injection into the core flow path.

12. The aircraft propulsion system as recited in claim 11, wherein the desiccation system comprises a means of interchanging different parts of the desiccant material between the first exhaust gas flow and the second exhaust gas flow.

13. The aircraft propulsion system as recited in claim 12, including a controller programed to interchange parts of the desiccation system to concentrate moisture within the second exhaust gas flow.

14. The aircraft propulsion system as recited in claim 11, wherein the second exhaust gas flow is tapped from a location upstream of an aft exit of the core engine.

15. The aircraft propulsion system as recited in claim 11, including a precooler where the first exhaust gas flow is cooled prior to communication with the desiccation system.

16. The aircraft propulsion system as recited in claim 11, wherein the evaporator system is in thermal communication with both the first exhaust gas flow and the second exhaust gas flow.

* * * * *